Sept. 14, 1965  R. R. WAREHAM  3,205,802

PHOTOGRAPHIC CAMERA AND ACCESSORY

Filed March 29, 1963  2 Sheets-Sheet 1

INVENTOR.
Richard R. Wareham
BY
Brown and Mikulka

ATTORNEYS

Sept. 14, 1965   R. R. WAREHAM   3,205,802
PHOTOGRAPHIC CAMERA AND ACCESSORY
Filed March 29, 1963   2 Sheets-Sheet 2
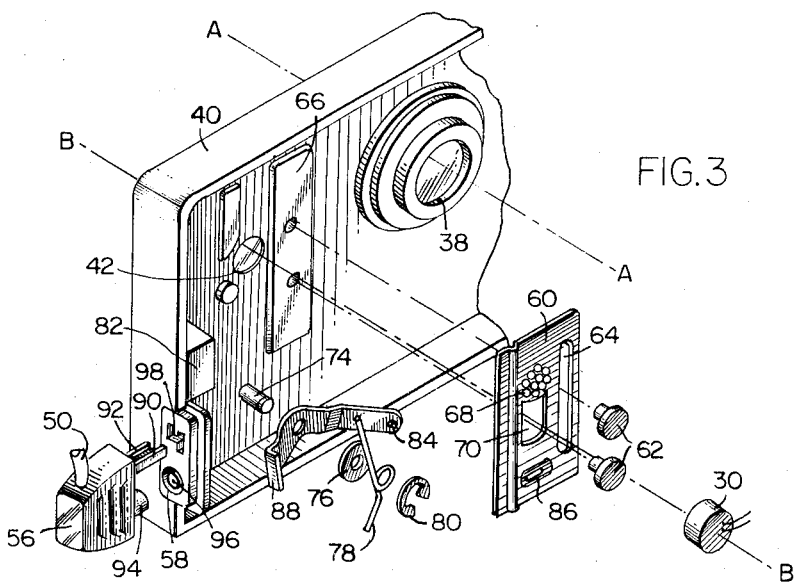
FIG. 3
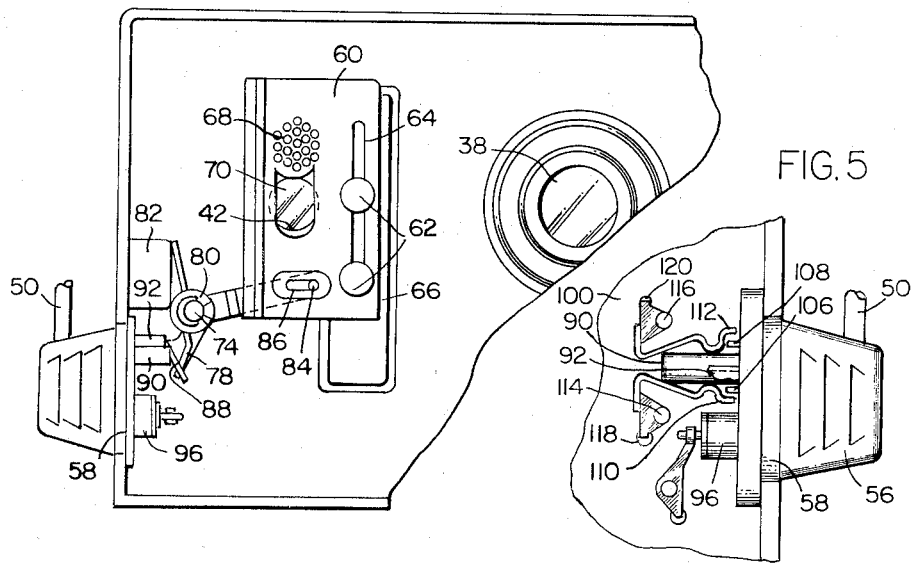
FIG. 4
FIG. 5
INVENTOR.
Richard R. Wareham
BY Brown and Mikulka
ATTORNEYS

United States Patent Office 3,205,802
Patented Sept. 14, 1965

3,205,802
PHOTOGRAPHIC CAMERA AND ACCESSORY
Richard R. Wareham, Marblehead, Mass., assignor to Polaroid Corporation, Cambridge, Mass., a corporation of Delaware
Filed Mar. 29, 1963, Ser. No. 268,998
8 Claims. (Cl. 95—11.5)

The present invention relates to photography and, more specifically, to novel means for performing certain functions in the operation of an automatic photographic exposure control device.

Many types of camera shutters are presently known wherein the duration of an exposure which is effected by movement of one or more shutter elements is controlled automatically in accordance with the light received from the scene being photographed. Originally such devices were designed to respond only to a constant intensity of ambient scene brightness and to establish the exposure duration in accordance therewith. More recently, exposure control devices have been provided which respond continuously to the intensity of light received from the scene so that proper exposures may be automatically provided even when the intensity is changing while an exposure is being made. A common instance of transient or changing scene light intensity during exposure is encountered, for example, when the scene is illuminated by auxiliary lighting means which provides a light pulse of relatively high intensity and short duration. Such apparatus includes tubes of rarefied gas to which a high voltage discharge is applied, lamp bulbs wherein a finely divided filament is caused to react chemically with an oxidizer, and incandescent lamp bulbs to which a momentary electrical overload is applied. Such apparatus is collectively referred to hereinafter for convenience as "photoflash apparatus."

It has been found that when photoresponsive means are employed to provide automatic control of exposure duration both when the scene light is substantially constant in intensity and when it is changing during exposure, as when provided by photoflash apparatus, it is necessary to compensate for errors which would otherwise result from the automatic operation of the device. For example, there is associated with conventional photoresponsive cells which are used in exposure control applications a characteristic known as the "speed of response." This means that when the intensity of the light incident on the cell changes, a time period elapses before the electrical property of the cell which varies in response to light intensity assumes a new equilibrium value corresponding to the new value of light intensity. When photoflash apparatus is used to illuminate the scene being photographed the intensity of light received from the scene changes more rapidly than the equilibrium value of the variable electrical property of the photocell is capable of changing. Therefore, unless some means for compensating for the difference between the actual and the equilibrium value of the property is provided an improper exposure will result, since the device is calibrated to provide proper exposures when the property is at its equilibrium value. An example of such compensating means is disclosed in the copending U.S. application of Jeremy M. Topaz, Serial No. 268,914, for Shutter Timing Apparatus, filed of even date herewith.

Another example of errors which otherwise may occur in the automatic operation of an exposure control device is associated with mechanical delays in the movement of shutter elements to initiate and terminate exposure in response to initiation and termination of the time interval which is determinative of exposure duration. The nature of such errors, as well as means operative to compensate therefor, is discussed more fully in U.S. application Serial No. 269,000, also of Jeremy M. Topaz and also filed of even date herewith.

Both of the above-mentioned errors are associated with automatic exposure control devices of the type disclosed in the patent applications referenced above, and the operation of which will be discussed more fully hereinafter, when such devices are used to determine automatically the duration of exposures when the scene is illuminated by photoflash apparatus. Also, the compensating means which are employed to reduce or eliminate such errors are movable between at least two positions so that the operation of the exposure control device may be changed when photoflash apparatus is to be used for illuminating the scene to be photographed.

Accordingly, it is a principal object of the present invention to provide, in an automatic exposure control device, means responsive to the installation of photoflash apparatus upon such device, or a photographic camera associated therewith, for rendering operative compensating means which alter the operation of the device to reduce or eliminate errors which may otherwise be present in the automatic operation of the device.

It is a further object to provide, in combination, means adapted for installation on a photographic camera to wire a photoflash apparatus into the camera flash synchronizing circuit and to move, in the course of such installation, compensating means for altering the operation of automatic exposure control means to an operative position.

Another object is to provide photoflash apparatus for installation on a photographic camera having a flash synchronizing circuit and automatic exposure control means, wherein both electrical and mechanical functions are performed by installing the apparatus upon the camera.

A still further object is to provide, in a photographic camera having a flash synchronizing circuit and automatic exposure control means, novel receptacle means for the installation of photoflash apparatus upon the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is an exploded perspective view of selected elements of the camera and photoflash device of FIG. 2;

FIG. 4 is a fragmentary plan view of the elements of FIG. 3, showing the elements in the positions they assume when the photoflash device is installed as shown; and FIG. 5 is a fragmentary plan view of additional elements of the camera, including portions of the circuit of FIGURE 1, and photoflash device.

Figure 1:
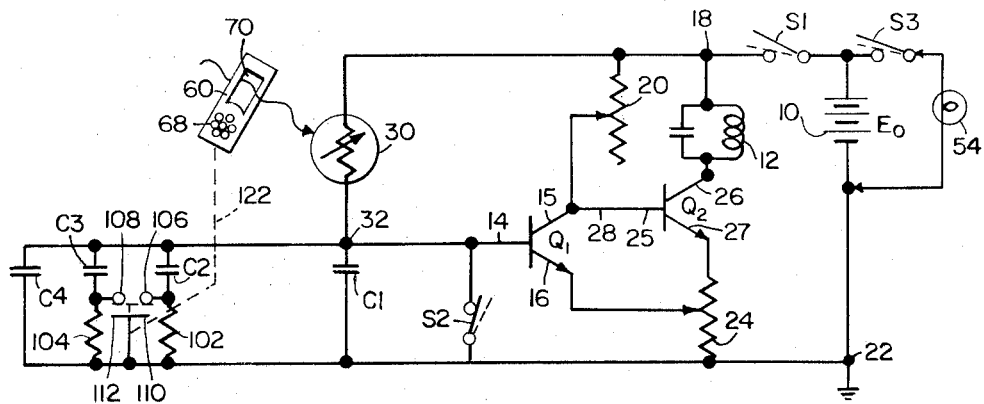
FIGURE 1 is a schematic circuit diagram of a photoresponsive timing circuit adapted to be associated with a photographic shutter for automatically controlling the duration of exposures effected thereby.

Transistorized trigger circuits which include photoresponsive means to adjust electrical parameters of the circuit in accordance with the intensity of scene brightness have been provided for use in the timing of photographic exposures. Such a circuit is schematically illustrated in FIGURE 1 of the drawings, and may be associated with a photographic exposure control device in a number of ways to control automatically the duration of exposures effected thereby. For example, the exposure control device may be in the form of a two-blade shutter having a first blade which is initially in a covering position relative to an aperture through which exposure is effected. The first blade may be moved to uncover the aperture, thus initiating an exposure, as by releasing a mechanical latch. A second blade is then moved, after the expiration of a time period established by the circuit, to cover the aperture, thus terminating the exposure.

The timing or trigger circuit of FIGURE 1 controls the flow of an energizing current to a solenoid, as will presently be explained, which may conveniently form a part of an electromagnet which is arranged to retain the aforementioned second blade in its initial position. When the flow of current to the solenoid is cut off, through the action of the circuit, the blade is free to move to its exposure-terminating position. A specific embodiment of suitable means for associating the circuit of FIGURE 1 with an exposure control device of the type described is fully disclosed in both of the previously mentioned U.S. applications as well as in application Serial No. 268,881, of John Burgarella et al., for Shutter Timing Apparatus, also filed of even date herewith.

The circuit of FIGURE 1 includes a voltage source 10, shown in the form of a battery of potential $E_0$, connected through normally open switch S1 to solenoid 12. Switch S1 may conveniently be moved to the closed position by movement of a conventional shutter release member which allows movement of the shutter device to initiate exposure.

The voltage sensitive trigger circuit has a normally not-conducting stage that includes transistor $Q_1$ having base, collector and emitter electrodes 14, 15 and 16 respectively. Collector electrode 15 of transistor $Q_1$ is connected to terminal 18 by variable bias resistor 20 and emitter electrode 16 of transistor $Q_1$ is connected to terminal 22 by variable bias resistor 24. The normally conducting stage of the circuit includes transistor $Q_2$ having base, collector and emitter electrodes 25, 26 and 27. Collector electrode 26 is connected to terminal 18 through solenoid 12 so that the latter is energized when transistor $Q_2$ conducts. Base electrode 25 of transistor $Q_2$ is connected to collector electrode 14 of transistor $Q_1$ through lead 28, and emitter electrode 27 of transistor $Q_2$ is connected through bias resistor 24 to terminal 22. It should be noted that with this arrangement there is esentially a common emitter resistor, the adjustment of resistor 24 being for the purpose of establishing the voltage at which it is desired to trigger the circuit. While the two stages of the circuit have been characterized as "normally not-conducting" and "normally-conducting" it should be obvious that this characterization is applicable only when power is applied to the circuit.

The timing network of the circuit includes a photoresponsive element 30, such as a cadmium sulfide photoconductor, for example, arranged to receive light from a scene being photographed and having a resistance which is functionally related to the intensity of such light. Element 30 is connected in series with an electrical impedance which, in the form shown, comprises a number of capacitors $C_1$, $C_2$, $C_3$ and $C_4$ connected to one another in parallel circuit arrangement. Thus, the timing network is connected between terminals 18 and 22 to form a conventional integrator circuit whose input is at terminal 18, and whose output is at terminal 32, the connection between element 30 and the capacitors.

Connected between output terminal 32 of the timing network and terminal 22 is a second switch S2 which is normally in the closed position. Switch S2 may be opened by movement of the previously described shutter elements to initiate exposure. In the operation of the device it is preferred that switch S1 be closed first to supply current to solenoid 12 and switch S2 then opened in synchronization, although not necessarily simultaneously, with initiation of exposure.

Transistor $Q_2$ conducts almost instantaneously with the closing of switch S1 because at the instant of closing, the collector-base junction of transistor $Q_2$ is reverse biased, causing leakage current to flow through resistor 20 establishing a forward bias on the emitter-base junction. The setting of variable resistor 20 establishes the degree to which transistor $Q_2$ conducts so that the current through solenoid 12 can be adjusted to provide proper magnetomotive force in the magnetic circuit to retain the shutter blade which subsequently moves to terminate exposure in its initial position. The flow of current through resistors 20 and 24, when transistor $Q_2$ conducts, establishes at collector 15 and emitter 16 of transistor $Q_1$, bias voltages having first values dependent upon the magnitudes of the respective currents and resistance values.

At the instant S1 is closed, and until switch S2 is opened the voltage at terminal 32 is ground potential. As above described, the timing means acts like a conventional integrator circuit. Thus, when a voltage is applied to input terminal 18 by closing switch S1, there appears at output terminal 32, upon opening of switch S2, a voltage which changes from an initial value (in the present example, ground potential) to a preselected value in a period of time dependent upon the values of the various capacitors $C_1$ through $C_4$ and the resistance of element 30 as established by the intensity of light received thereby from the scene being photographed. When the voltage at terminal 32 is at its initial value, and the voltages at collector 26 and emitter 27 are at their first values of bias voltage due to the conduction of transistor $Q_2$, the collector-base and emitter-base of transistor $Q_1$ are reverse biased, thus resulting in transistor $Q_1$ being cut off, or nonconducting. When the voltage at output terminal 32 reaches the preselected value which forward biases the emitter-base junction of transistor $Q_1$, the latter begins to conduct.

Figure 2:
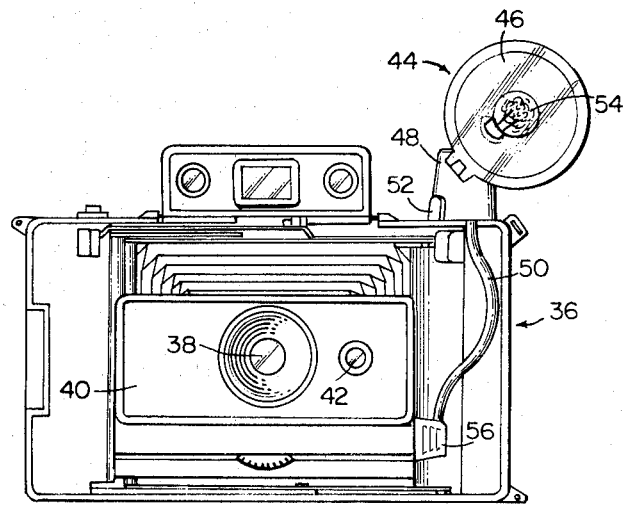
FIG. 2 is a front elevational view of a photographic camera having a shutter controlled by the circuit of FIGURE 1 and having a photoflash device mounted thereon.

In FIG. 2 there is shown a photographic camera, indicated generally the reference numeral 36, having the usual exposure aperture 38 in the front wall of shutter housing 40. Although camera 36 may be of any previously known type or configuration, the shutter mechanism thereof (not shown) is of a construction suitable for control by the circuit of FIGURE 1. Photoresponsive element 30 of the circuit is disposed behind aperture 42 to receive light from a scene photographed through exposure aperture 38.

Photoflash device 44 includes reflector 46, base 48 and electrical leads 50. Base 48 is detachably mountable upon camera 36 by any convenient means previously known in the art and may be removed therefrom by pressing release member 52. Bulb 54, which may comprise any known photoflash light source, is positioned in operation relation to reflector 46 to project light forwardly of camera 36 to illuminate a scene to be photographed thereby. When using photoflash apparatus which provides a high intensity light for short duration, it is normally necessary to synchronize actuation of the bulb with the movement of the camera shutter to effect an explosure. For this reason, it is a common practice to provide what is known as a flash synchronizing circuit in photographic cameras which are adapted to be used in conjunction with photoflash apparatus. By this means, power is supplied to actuate the bulb by closing a switch in timed relation to the opening of the camera shutter to initiate exposure. In fact, the switch is often closed by movement of the shutter blade itself.

Switch S3 in the circuit diagram of FIGURE 1 indicates a flash synchronizing switch for supplying power to bulb 54, which is also seen in FIGURE 1. Although the circuit diagram indicates that bulb 54 receives power from voltage source 10 upon closure of switch S3, it is also possible, and sometimes desirable, to provide a separate power source for actuating bulb 54. Plug 56 is provided on the end of flexible electrical leads 50 and is adapted to be inserted in a receptacle 58, as will be explained later in more detail, in shutter housing 40.

In the above-referenced U.S. application Serial No. 268,914 there is disclosed a method and apparatus for adjusting the functional relationship between the intensity of scene brightness and the resistance of the photocell in such a way as to compensate for errors due to the speed of response of the photocell when exposed to light of rapidly varying intensity. One embodiment of such apparatus is shown in FIGS. 3 and 4. The optical axis of camera 36 is indicated as A—A, and the axis of photocell 30 and aperture 42 as B—B. Opaque plate 60 is mounted for sliding movement upon pins 62 which extend through elongated slot 64 in plate 60 to a fixed mounting upon an interior portion 66 of shutter housing 40. Plate 60 includes first aperture means 68 which, in the embodiment shown, comprises a plurality of relatively small fixed openings, and second aperture means 70, which comprises a single, relatively large opening.

Crank 72 is pivotally mounted upon fixed pin 74 which extends from shutter housing 40. Spacer element 76 is mounted on pin 74 between crank 72 and spring 78, and all are secured upon the pin by means such as lock washer 80. As best seen in FIG. 4, one end of spring 80 bears against fixed stop 82 on shutter housing 40 and the other end bears on a portion of crank 72 to bias the crank in a clockwise direction as seen in FIG. 4. On one side of its pivotal mounting, crank 72 includes a fixed pin 84 which extends through a slightly elongated opening 86 in a plate 60. An ear 88 extends from the end of crank 72 remote from pin 84.

Extending from plug 56 for insertion in receptacle 58 are element 90, L-shaped arm 92 and electrical connector 94 which is operatively attached to leads 50. Receptacle 58 includes electrical jack 96, into which connector 94 may be inserted, and opening 98, through which both element 90 and arm 92 extend when plug 56 is inserted as shown, for example, in FIG. 4. Insertion of connector 94 into jack 96 serves to wire photoflash device 44 into the flash synchronizing circuit of camera 36. When plug 56 is inserted, arm 92 extends through opening 98 to contact ear 88 of crank 72 and rotate the crank in a counterclockwise direction against the bias of spring 78. Plate 60 is thereby moved to and retained in the position shown in FIG. 4, with aperture means 70 aligned with axis B—B, through the movement of pin 84 as the end of crank 72 is rotated. When plug 56 is removed, crank 72 rotates in a clockwise direction, under the bias of spring 78, moving plate 60 to a position wherein aperture means 68 is in alignment with axis B—B. The elongation of opening 86 provides free movement for the arcuate path of pin 84 while plate 60 moves linearly.

Referring now to FIG. 5, the numeral 100 denotes a fragment of a base block upon which the electrical elements of the circuit of FIGURE 1 are mounted. A fragmentary portion of arm 92 may also be seen, the view being from the opposite side of plug 56 from that of FIG. 4. Base 100 and the elements mounted thereon are not shown in FIGS. 3 and 4 in order not to obscure the other elements shown in these figures.

Referring again to FIGURE 1, resistors 102 and 104 are respectively connected in series with capacitors $C_2$ and $C_3$. Extending from a connection between each of these resistors and its associated capacitor are a pair of electrical switch contacts 106 and 108, each of which is associated with a second contact 110 and 112, respectively. The above contacts are shown in FIG. 5, as well as in FIGURE 1 where the same reference numerals are used to denote their schematic counterparts. Contacts 110 and 112 are in the form of springs, biased toward contacts 106 and 108, respectively, and are anchored to base 100 by rivets 114 and 116. Terminals 118 and 120 of contacts 110 and 112 are connected to terminal 22, that is, to ground potential.

As seen in FIG. 5, when plug 56 is inserted in receptacle 58, element 90 engages both contacts 110 and 112 and holds them apart from contacts 106 and 108. When plug 56 is withdrawn, the spring bias of contacts 110 and 112 returns them to engagement with contacts 106 and 108. Thus, when plug 56 is inserted, the contacts are in the position indicated by solid lines in FIGURE 1, placing resistors 102 and 104 in series with capacitors $C_2$ and $C_3$, respectively. When the plug is removed, capacitor $C_2$ is connected, through contacts 106 and 110, and capacitor $C_3$ is connected, through contacts 108 and 112, directly to ground, thus bypassing resistors 102 and 104, as indicated by the dotted position of contacts 110 and 112 in FIGURE 1.

Placing resistors 102 and 104 in series with capacitors $C_2$ and $C_3$ has the effect of shortening the time required for the charge on the capacitors to reach the preselected voltage required to forward bias the base-emitter junction of transistor $Q_1$. Since a transient current flows through resistors 102 and 104 as soon as switch S2 is opened, an initial voltage, equal to the initial IR drops across the resistors, appears on capacitors $C_2$ and $C_3$. Thus, it is necessary to raise the charge on the capacitors from this initial voltage to the preselected trigger voltage, rather than from ground potential as when the resistors are not in the circuit. The reasons for thus shortening the timing period established by the circuit, and thus the exposure duration, are discussed fully in the previously-mentioned U.S. application Serial No. 269,000.

Since element 90 performs the electrical function of separating spring biased electrical contacts, it is preferably made of a rigid, electrically insulating material. Arm 92 performs the purely mechanical function of moving crank 72 about its pivotal mounting and may therefore be made of any suitable rigid material, such as metal. For increased structural rigidity one leg of the L-shaped arm is preferably affixed to element 92.

Plate 60 is shown diagrammatically in FIGURE 1, dotted line 122 between the plate and contacts 110 and 112 indicated cooperative movement of the elements. The wavy line denotes light rays incident on photosensitive element 30, indicating that aperture means 70 is positioned on axis B—B, between element 30 and light from the scene being photographed, when switch contacts 110 and 112 are in the position shown in solid lines. The elements are retained in this positon by portions of plug 56, insertion of which in receptacle 58 also wires photoflash device 44 into the flash synchronizing circuit of camera 36. When the plug is withdrawn, plate 60 moves to position aperture means 68 between element 30 and light from the scene and contacts 110 and 112 move to the position shown in dotted lines in FIGURE 1. Of course, the electrical connection between the photoflash device and the camera flash synchronizing circuit is also removed so that the device, even if still mounted upon the camera, will not be actuated by closure of flash synchronizing switch S3. It is possible, of course, to associate the elements of plug 56 directly with the base of the photoflash device rather than through the flexible electrical leads shown. The configuration and arrangement of the various elements both on the camera and on the photoflash apparatus, therefore, insure proper operation of the exposure control means automatically in response to installation of the apparatus upon the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic camera having an automatic exposure control device with a flash synchronizing circuit and a voltage sensitive trigger circuit for terminating exposure at the conclusion of an exposure interval in response to the intensity of light received from the scene being photographed, and said trigger circuit including selective impedance means affecting the response of said trigger circuit, and receptacle means for receiving a plug associated with photoflash apparatus adapted to illuminate a scene to be photographed by said camera, said receptacle means comprising, in combination:

(a) a jack for receiving electrical leads from said photoflash apparatus, thereby connecting said apparatus with said flash synchronizing circuit;

(b) at least one pair of electrical contacts comprising a portion of said trigger circuit and cooperating with said selective impedance means to determine the value of said impedance means connected in said trigger circuit, said contacts being so positioned that at least one contact of said pair is moved relative to the other contact of said pair when said plug is inserted in said receptacle means, thereby altering the electrical parameters of said trigger circuit; and (c) means for moving said one contact back to its original position relative to said other contact in response to removal of said plug from said receptacle means, whereby said electrical parameters are restored to their original condition.

2. The invention according to claim 1 wherein said electrical contacts comprise a switch which is opened and closed in response to insertion and removal of said plug.

3. Photographic exposure apparatus having a flash synchronizing circuit and a photoresponsive element disposed to receive light from a scene being photographed and having an electrical property which bears a functional relationship to the intensity of said light and comprising in combination:

(a) a jack into which may be inserted a plug associated with a photoflash device for connecting said device with said flash synchronizing circuit;

(b) a movable member disposed for movement between first and second positions relative to said photoresponsive element for changing said functional relationship between first and second values;

(c) means urging said movable member toward said first position; and (d) means for moving said movable member to said second position in response to insertion of said plug in said jack.

4. The invention according to claim 3 wherein said movable member comprises an opaque plate positioned between said photoresponsive element and said light and having first and second aperture means therein, whereby light incident on said element passes through said first aperture means when said movable member is in said first position and through said second aperture means when said movable member is in said second position.

5. A photographic camera having an automatic exposure control device with a flash synchronizing circuit and a voltage sensitive trigger circuit including a photoresponsive element disposed to receive light from a scene being photographed and having an electrical property which bears a functional relationship to the intensity of said light, said circuit being adapted to control the termination of exposure at the conclusion of an exposure interval in response to the intensity of light received by said element from the scene being photographed, said trigger circuit including selective impedance means for affecting the response of said trigger circuit, and receptacle means for receiving a plug associated with photoflash apparatus adapted to illuminate a scene to be photographed by said camera, said receptacle means comprising, in combination:

(a) a jack for receiving electrical leads from said photoflash apparatus, thereby connecting said apparatus with said flash synchronizing circuit, when said plug is inserted in said receptacle means;

(b) at least one pair of electrical contacts comprising a portion of said trigger circuit and cooperating with said selective impedance means to determine the value of said impedance means connected in said trigger circuit, said contacts being so positioned that at least one contact of said pair is moved relative to the other contact of said pair when said plug is inserted in said receptacle means, thereby altering the electrical parameters of said trigger circuit;

(c) means for moving said one contact back to its original position relative to said other contact in response to removal of said plug from said receptacle means, whereby said electrical parameters are restored to their original condition;

(d) a movable member disposed for movement between first and second positions relative to said photoresponsive element for changing said functional relationship between first and second values;

(e) means urging said movable member toward said first position; and (f) means for moving said movable member to said second position in response to insertion of said plug in said jack.

6. The invention according to claim 5 wherein said electrical contacts comprise a switch which is opened and closed in response to insertion and removal of said plug.

7. Photographic apparatus comprising a photographic camera having (a) a flash synchronizing circuit;

(b) a voltage-sensitive trigger circuit including a photoresponsive element and adapted to control the duration of exposures effected by said camera in response to the intensity of light received by said element from the scene being photographed, said trigger circuit including cooperating electrical contacts arranged to alter the electrical parameters of said trigger circuit;

(c) a movable member disposed for movement between first and second positions relative to said photoresponsive element for changing the functional relationship between said element and the rest of said trigger circuit between first and second values respectively; and (d) receptacle means including a second set of cooperating electrical contacts connected to said flash synchronizing circuit; and photographic flash apparatus for use with said camera including a plug for insertion into said electrical means, said plug comprising (1) an electrical connector for connecting said photoflash apparatus with said second set of contacts in response to insertion of said plug into said receptacle means;

(2) a first arm of electrically insulating material constructed and arranged to engage and move at least one of the first-mentioned electrical contacts relative to another one thereof in response to insertion of said plug into said receptacle means; and (3) a second arm constructed and arranged to engage and move said movable member from said first to said second position in response to insertion of said plug into said receptacle means.

8. The invention according to claim 7 wherein said plug includes manually engageable support means, and said connector, said first arm and said second arm all extend in a first direction from said support means.

References Cited by the Examiner

UNITED STATES PATENTS 3,005,392   10/61   Kaden _____ 95—11.5

FOREIGN PATENTS 930,434   7/55   Germany.

JOHN M. HORAN, *Primary Examiner.*

NORTON ANSHER, *Examiner.*